(12) United States Patent
Haubrich et al.

(10) Patent No.: US 11,352,517 B2
(45) Date of Patent: Jun. 7, 2022

(54) PHOTOLUMINESCENT IRON-DOPED BARIUM STANNATE MATERIAL, SECURITY INK COMPOSITION AND SECURITY FEATURE THEREOF

(71) Applicant: SICPA HOLDING SA, Prilly (CH)

(72) Inventors: Scott Haubrich, Albuquerque, NM (US); Pascal Pinceloup, Albuquerque, NM (US); Eden Michele Anthanasee Green, Albuquerque, NM (US); David Anderson, Albuquerque, NM (US); Matthew Sturgeon, Albuquerque, NM (US)

(73) Assignee: SICPA HOLDING SA, Prilly (CH)

( * ) Notice: Subject to any disclaimer, the term of this patent is extended or adjusted under 35 U.S.C. 154(b) by 146 days.

(21) Appl. No.: 16/496,309

(22) PCT Filed: Mar. 20, 2018

(86) PCT No.: PCT/EP2018/056948
§ 371 (c)(1),
(2) Date: Sep. 20, 2019

(87) PCT Pub. No.: WO2018/172318
PCT Pub. Date: Sep. 27, 2018

(65) Prior Publication Data
US 2020/0095445 A1    Mar. 26, 2020

Related U.S. Application Data

(60) Provisional application No. 62/473,737, filed on Mar. 20, 2017.

(30) Foreign Application Priority Data

May 2, 2017   (EP) .................................. 17169120

(51) Int. Cl.
*C09D 11/50* (2014.01)
*B42D 25/21* (2014.01)
(Continued)

(52) U.S. Cl.
CPC ............. *C09D 11/50* (2013.01); *B41M 3/144* (2013.01); *B42D 25/21* (2014.10); *B42D 25/382* (2014.10);
(Continued)

(58) Field of Classification Search
CPC ..... C09D 11/50; C09D 11/037; C09D 11/322; C09D 11/00; B42D 25/21; B42D 25/382;
(Continued)

(56) References Cited

U.S. PATENT DOCUMENTS

| 4,153,593 A | 5/1979 | Zabiak et al. |
| 5,135,569 A | 8/1992 | Mathias |

(Continued)

FOREIGN PATENT DOCUMENTS

| CN | 105405973 | 3/2016 |
| EP | 0985007 | 5/2006 |

(Continued)

OTHER PUBLICATIONS

Chinese Office Action in counterpart Chinese Application No. 201880019560.8 dated May 20, 2020 (along with the English language translation of the Office Action).
(Continued)

*Primary Examiner* — Justin V Lewis
(74) *Attorney, Agent, or Firm* — Muncy, Geissler, Olds & Lowe, P.C.

(57) ABSTRACT

The present invention provides photoluminescent iron-doped barium stannate materials absorbing ultraviolet (UV) light and exhibiting strong near-infrared (NIR) luminescence. Such materials exhibit increased integrated photolu-
(Continued)

minescence intensity in comparison to known $BaSnO_3$ and iron-doped barium stannate materials, and therefore they are particularly useful for the production of photoluminescent security ink compositions and transparent covert security features with improved anti-counterfeiting resistance that can be used for protection of documents and articles against counterfeit and illegal reproduction.

20 Claims, 6 Drawing Sheets

(51) Int. Cl.
*B42D 25/382* (2014.01)
*B42D 25/387* (2014.01)
*C09D 11/037* (2014.01)
*C09D 11/322* (2014.01)
*C09K 11/66* (2006.01)
*G07D 7/1205* (2016.01)
*C09D 11/00* (2014.01)
*B41M 3/14* (2006.01)
*G01N 21/64* (2006.01)

(52) U.S. Cl.
CPC .......... *B42D 25/387* (2014.10); *C09D 11/037* (2013.01); *C09D 11/322* (2013.01); *C09K 11/663* (2013.01); *G01N 21/6408* (2013.01); *G07D 7/1205* (2017.05); *G07D 2207/00* (2013.01)

(58) Field of Classification Search
CPC ............... B42D 25/387; G07D 7/1205; G07D 2207/00; B41M 3/144; B41M 3/14; C09K 11/663; C09K 11/66; G01N 21/6408; G01N 21/64
USPC ....... 283/67, 70, 72, 75, 82, 83, 94, 98, 901
See application file for complete search history.

(56) References Cited

U.S. PATENT DOCUMENTS

| 5,470,502 | A | 11/1995 | Hahn et al. |
|---|---|---|---|
| 6,180,029 | B1 | 1/2001 | Hampden-Smith et al. |
| 7,922,936 | B2 | 4/2011 | Hampden-Smith et al. |
| 8,123,848 | B2 | 2/2012 | Birau et al. |
| 8,337,611 | B2 | 12/2012 | Pfaff et al. |
| 2007/0225402 | A1 | 9/2007 | Choi et al. |
| 2015/0118458 | A1 | 4/2015 | Kobayashi et al. |
| 2016/0243876 | A1 | 8/2016 | Kecht et al. |
| 2017/0206997 | A1* | 7/2017 | Al-Harthi ................ H01B 1/24 |

FOREIGN PATENT DOCUMENTS

| JP | 59174528 | 10/1984 |
|---|---|---|
| JP | 6383653 | 4/1988 |
| JP | 63292055 | 11/1988 |
| JP | 5232065 | 9/1993 |
| JP | 2015168728 | 9/2015 |
| RU | 2571751 | 12/2015 |
| WO | 2002055646 | 7/2002 |
| WO | 2010137247 | 12/2010 |
| WO | 2012172018 | 12/2012 |
| WO | 2015/016399 | 2/2015 |
| WO | 2016121792 | 8/2016 |

OTHER PUBLICATIONS

Indian Office Action (First Examination Report) in counterpart Indian Application No. 201917027227 dated Sep. 11, 2020.
R.L. van Renesse, "Optical Document Security," third edition, 2005, p. 98-102.
Mizoguchi et al., "Strong Near-Infrared Luminescence in BaSnO3," J. Am. Chem. Soc. 2004, 126, pp. 9796-9800.
Adak et al., "Phase Evaluation, microscopy and Band gap of Fe-doped nanocrystalline BaSnO3 by Solid-Sate Sintering assisted with agate-mortar activation," International Journal of Current Engineering and Technology, vol. 5, No. 6, Dec. 2015, pp. 3829-3834.
B.M. Krasovitskii & B.M. Bolotin, "Organic Luminescent Materials", 1988, VCH Verlagsgesellschaft, 7 pages.
Bunzli, "On the design of highly luminescent lanthanide complexes," Coordination Chemistry Reviews 293-294, 2015 pp. 19-47.
James et al., "Structural optical and magnetic properties of Fe-doped barium stannate thin films grown by PLD," Applied Surface Science, vol. 282, Oct. 1, 2013 (Oct. 1, 2013), pp. 121-125, XP028684514, ISSN: 0169-4332, DOI: 10.1016/J.APSUSC.2013. 05.076.
International Search Report and Written Opinion dated May 15, 2018 with respect to application No. PCT/EP2018/056948, 7 pages.
Chinese Office Action in counterpart Chinese Application No. 201880019560.8 dated Aug. 26, 2020 (and English language translation of the Office Action).
Russian Office Action in counterpart Russian Application No. 2019126516 dated Jul. 12, 2021 (and English language translation of the Office Action).
Japanese Office Action in counterpart Japanese Application No. P2019-546815 dated Oct. 12, 2021 4 pages (and English language translation of the Office Action).

* cited by examiner

PHOTOLUMINESCENT IRON-DOPED BARIUM STANNATE MATERIAL, SECURITY INK COMPOSITION AND SECURITY FEATURE THEREOF

FIELD OF THE INVENTION

The present invention relates to the field of security features and their uses for the protection of documents and articles against counterfeit and illegal reproduction. In particular, the present invention relates to the field of photoluminescent barium stannate materials absorbing ultraviolet (UV) light and exhibiting strong near-infrared (NIR) luminescence. Such materials are particularly useful for the production of security ink compositions and covert security features with improved anti-counterfeiting resistance.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means in these documents. Typical examples of security means include security threads, windows, fibers, planchettes, foils, decals, holograms, watermarks, security inks comprising optically variable pigments, magnetic or magnetizable thin-film interference pigments, interference-coated particles, thermochromic pigments, photochromic pigments, luminescent, infrared-absorbing, ultraviolet-absorbing or magnetic compounds.

The use of photoluminescent materials in the field of security documents printing is known in the art: see for example Optical Document Security from R. L: van Renesse, third edition, 2005, p. 98-102. A photoluminescent material is a material that is capable of emitting detectable quantities of radiation in infrared (IR), visible (VIS) and/or ultraviolet (UV) spectrum upon excitation with an external electromagnetic radiation.

Typically, photoluminescent materials used for producing security features in the field of value or security documents absorb in the UV-spectrum range and emit in the VIS-spectrum range. This type of behavior is exhibited by both inorganic and organic materials, which once exposed to UV radiation, emit in the VIS-spectrum range. Thus, the security feature is detectable by using a UV lamp and observing the luminescence with naked eyes.

Large Stokes shift materials absorbing in the UV-spectrum range, but not in the VIS-spectrum range and emitting in the NIR- or IR-spectrum range, thereby requiring special equipment for inducing and detecting their luminescence, have been found to be particularly useful for the production of covert security features i.e. of security features that cannot be authenticated by the unaided eye, but which for authentication depends on a detecting or reading device, such as an electronic authentication equipment. NIR luminescent barium stannate with large Stokes shift was described by Mizoguchi et al. (*J. Am. Chem. Soc.* 2004, 126, 9796). The barium stannate ($BaSnO_3$) described by Mizoguchi et at exhibits a broad luminescence centered at 905 nm, upon excitation at 380 nm, but does not exhibit luminescence in the VIS-spectrum range. Luminescence emission was described also for $Ba_{1-x}Sr_xSnO_3$ series. It was observed that the intensity of the NIR emission peaks decreases with the increase of the strontium content, thus $BaSnO_3$ exhibiting the strongest emission intensity.

The authentication techniques of covert security features containing photoluminescent materials emitting in the NIR- or IR-spectrum range upon irradiation with UV light are highly effective at detecting relatively unsophisticated forgery and counterfeiting products. Nevertheless, individuals with the appropriate resources and equipment might be able to reverse engineer an authentication system and/or to employ spectrometry techniques in order to determine the components of some photoluminescent materials. The photoluminescent materials might be afterwards reproduced and applied to unauthentic documents or articles, thereby compromising the authentication benefits that might be provided by a particular photoluminescent material. Therefore, although photoluminescent materials absorbing in the UV-spectrum range and emitting in the IR-spectrum range have been developed for producing high-security covert security feature, it is desirable to develop further photoluminescent materials, which may render forgery and counterfeiting activities more difficult and/or may prove beneficial for authenticating articles and documents of particular interest.

Iron-doped barium stannate $BaSn_{1-x}Fe_xO_3$ with x being 0.02, 0.03, 0.05, 0.10 and 0.15 were also described (Adak et al. *International Journal of Current Engineering and Technology*, 2015, 3829; James et al. *Applied Surface Science* 2013, 121). Nevertheless, as shown by Table 3, iron-doped barium stannate materials (samples E17, E18 and E19 in Table 3) having ferric cation concentrations comparable to the $BaSn_{1-x}FeO_3$ materials described in the literature, as well as the known undoped $BaSnO_3$ material present a weak emission signal in the NIR-spectrum range and therefore, they are not easily detectable and consequently, cannot be efficiently used for the production of covert security features.

Thus, a need remains for alternative photoluminescent materials, absorbing in the UV-spectrum range, but not in the VIS-spectrum range and exhibiting strong emission luminescence in the NIR-spectrum range. Such photoluminescent materials require the use of special equipment for inducing and detecting their photoluminescence and therefore, they are particularly useful for the production at reduced costs of covert security features and/or production of improved and more efficient covert security features.

SUMMARY OF THE INVENTION

Accordingly, it is the object of the present invention to provide a photoluminescent iron-doped barium stannate material absorbing in the UV-spectrum range, but not in the VIS-spectrum range and exhibiting significantly stronger photoluminescence intensities in the NIR-spectrum range than $BaSnO_3$ and iron-doped $BaSnO_3$ samples of the prior art. This is achieved by the iron-doped barium stannate material described herein having a ferric cation ($Fe^{3+}$) concentration of about 10 to about 500 ppm by weight.

Further claimed and described herein is a photoluminescent security ink composition comprising the iron-doped barium stannate material exhibiting strong photoluminescence intensity in the NIR-spectrum range described herein. In particular, the photoluminescent security ink composition may further comprise one or more photoluminescent substances absorbing in the UV-spectrum range and emitting in the VIS-spectrum range.

Also claimed and described herein is a security feature made with the photoluminescent security ink composition described herein, as well as a process for manufacturing the security feature comprising the steps of applying on a substrate, preferably by a coating or printing process, the photoluminescent security ink composition so as to form a photoluminescent security layer, and hardening the photoluminescent security layer.

Also claimed and described herein is a security document or article comprising one or more of the security features described herein, as well as a method for authenticating said security document or article, comprising the steps:

a) illuminating the one or more security features described herein on the security document or article with ultraviolet light;

b) measuring the spectral parameters of the radiation emitted by the one or more security features in response to the illumination with the ultraviolet light; and c) determining the authenticity of the security document or article.

Preferably, step b) of the authentication method comprises measuring the intensity of the radiation emitted by the security feature at one or more predefined near infrared wavelengths and/or the integrated intensity spectrum of the radiation emitted by the security feature between two predefined near infrared wavelengths and/or measuring the decay property of the emitted radiation.

Further claimed and disclosed herein are manufacturing processes of the iron-doped barium stannate material having a ferric cation ($Fe^{3+}$) concentration of about 10 to about 500 ppm by weight.

One of the manufacturing processes comprises the steps:

d) addition of an appropriate volume of $Fe^{3+}$ aqueous solution to a pre-stirred aqueous solution comprising $Ba^{2+}$ and $Sn^{4+}$;

e) addition of the aqueous solution of step d) to a NaOH aqueous solution, thereby causing the formation of iron-doped $BaSn(OH)_6$ precipitate;

f) adjusting the pH of the suspension of step e), preferably by addition of a NaOH or HCl aqueous solution, to about 11;

g) separation of the iron-doped $BaSn(OH)_6$ precipitate; and h) calcination of the iron-doped $BaSn(OH)_6$ precipitate.

A further manufacturing process of the herein described iron-doped barium stannate material comprises the steps:

i) addition of an appropriate volume of $Fe^{3+}$ solution to a mixture of $BaCO_3$ and $SnO_2$;

j) grinding the mixture of step i); and k) calcination of the mixture obtained at step j).

Preferably, step l) is conducted after step h) or k) of the above-described processes:

l) sieving the calcined precipitate obtained at step h) or k).

The iron-doped barium stannate material described herein exhibits stronger integrated photoluminescence intensity in the NIR-spectrum range than $BaSnO_3$ described by Mizoguchi et al. and the iron-doped barium stannate material of general formula $BaSn_{1-x}Fe_xO_3$ with x being 0.02, 0.03, 0.05, 0.10 and 0.15 described by Adak et al. and James et al., Replacing $BaSnO_3$ and $BaSn_{1-x}Fe_xO_3$ with x being 0.02, 0.03, 0.05, 0.10 and 0.15 by the iron-doped barium stannate described herein in a security ink composition allows both the production of security features with improved luminescence properties and the production of security features having similar luminescence properties at a reduced cost.

DETAILED DESCRIPTION

Definitions

Figure 1:
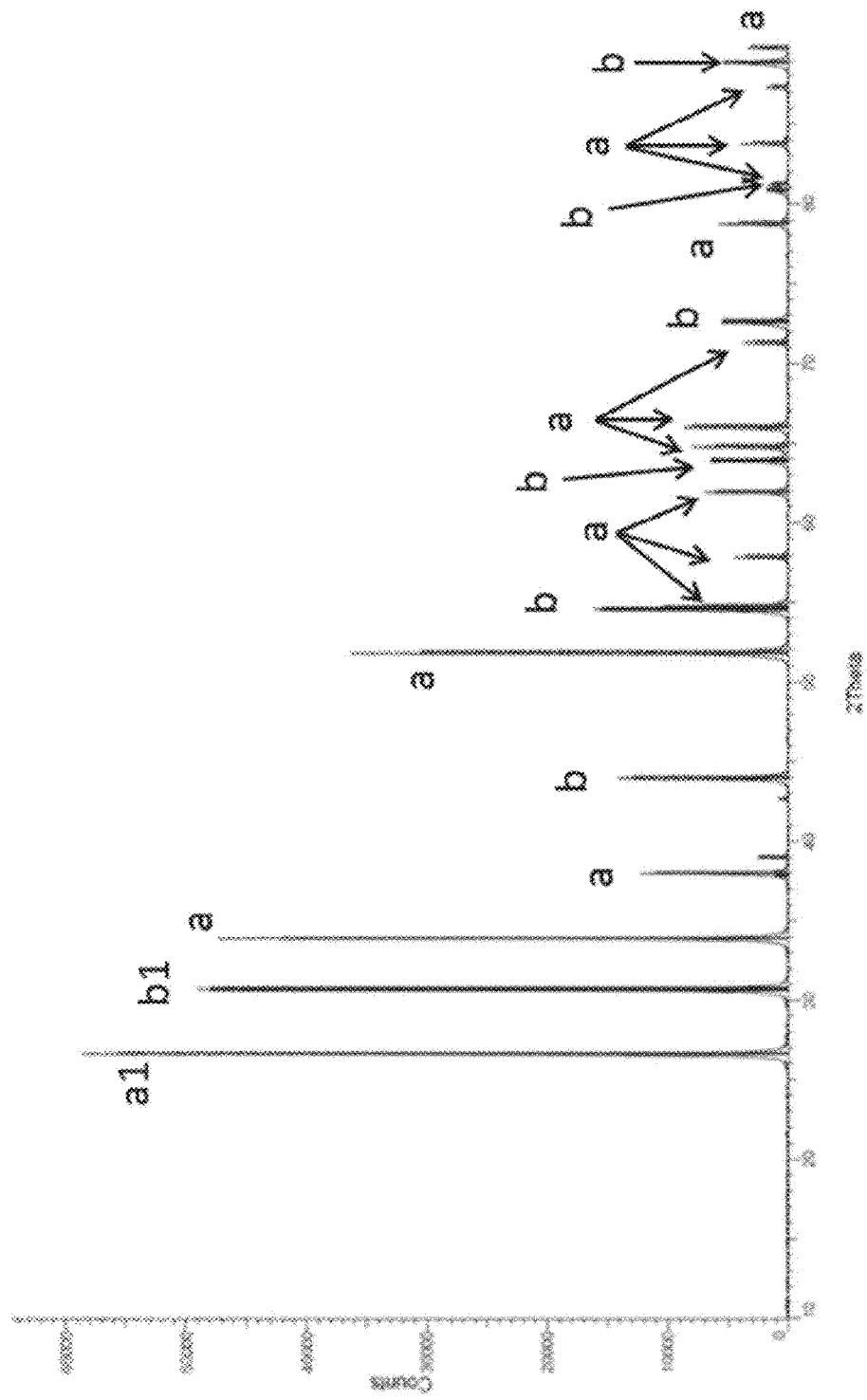
FIG. 1 shows the XRD diffractogram of sample C1 containing a mixture of $BaSnO_3$ and $SnO_2$ powder.
Figure 2:
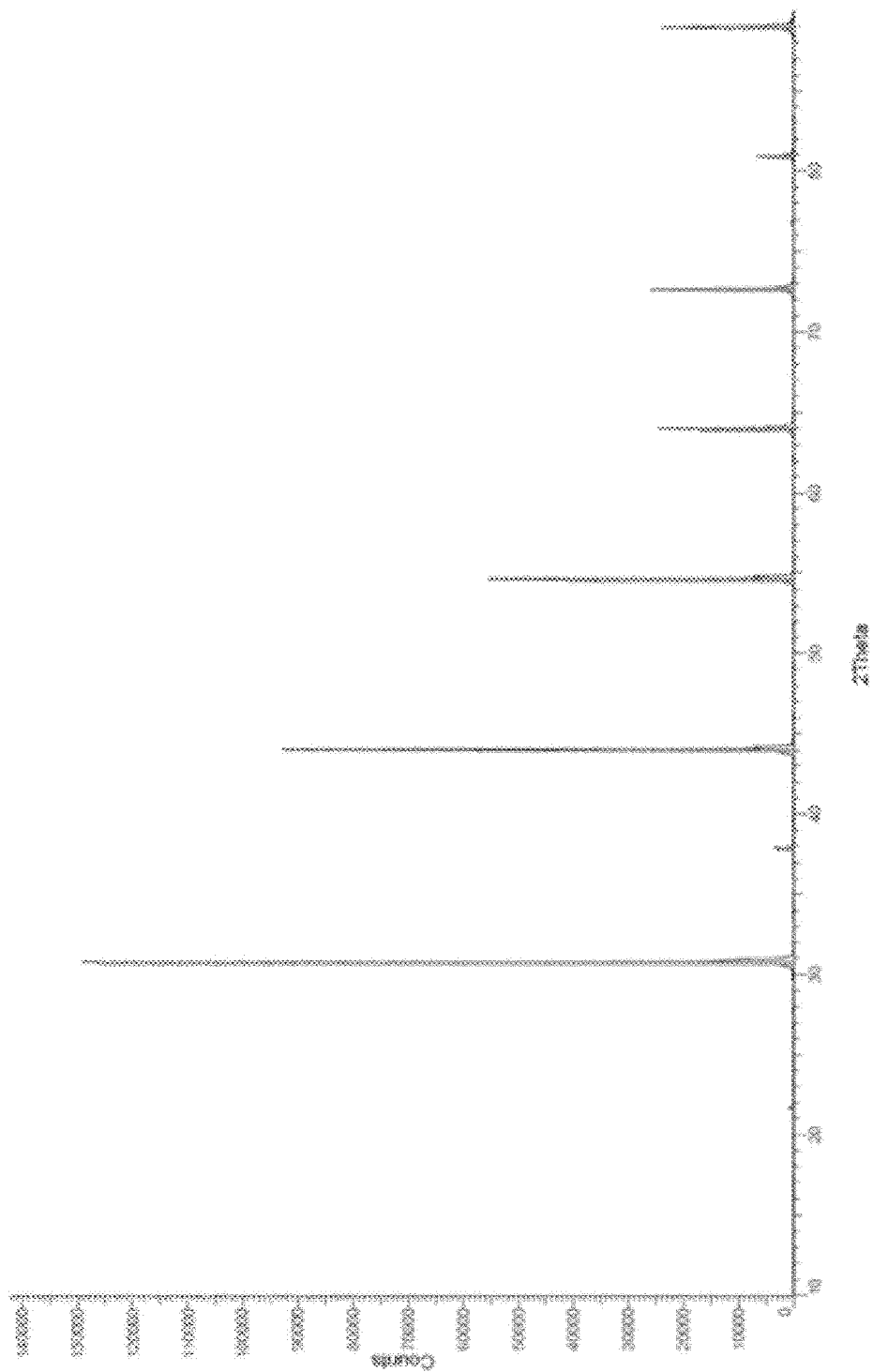
FIG. 2 shows the XRD diffractogram of "un-doped" $BaSnO_3$ sample (C3) used as comparative example.

The following definitions are to be used to interpret the meaning of the terms discussed in the description and recited in the claims.

As used herein, the article "a/an" indicates one as well as more than one, and does not necessarily limit its referent noun to the singular.

As used herein, the term "at least" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

The term "liquid carrier" as used herein encompasses any liquid that acts as a carrier or materials distributed in a solid state and/or dissolved therein.

The term "layer" as used herein refers to a film resulting from a composition containing at least one film-forming polymeric resin and a liquid carrier that is substantially dry.

The term "security ink composition" refers to any composition, which is capable of forming a layer on a solid substrate and which can be applied preferentially, but not exclusively by a printing method.

The term "security feature" designates an element or a feature on a security document or article for the purpose of determining its authenticity and protecting it against counterfeits and illegal reproduction. The term "security feature" is used to denote an indicium, image, pattern or graphic element that can be used for authentication purposes.

The term "security document" and "security article" refers to a document or article having a value such as to render it potentially liable to attempts at counterfeiting or illegal reproduction and which is usually protected against counterfeit or fraud by at least one security feature. The term "security article" as used herein encompasses all articles that shall be protected against counterfeiting and/or illegal reproduction in order to warrant their content.

Where the present description refers to "preferred" embodiments/features, combinations of these "preferred" embodiments/features shall also be deemed as disclosed as long as this combination of "preferred" embodiments/features is technically meaningful.

Surprisingly, it was found that an iron-doped barium stannate material having a ferric cation ($Fe^{3+}$) concentration of about 10 to about 500 ppm by weight absorbs in the UV-spectrum range, but not in the VIS-spectrum range, and exhibits stronger integrated photoluminescence intensity in the NIR-spectrum range than known barium stannate and known iron-doped barium stannate. The ferric cation ($Fe^{3+}$) concentration is determined by any of the following methods: inductively coupled plasma optical emission spectroscopy (ICP-OES), inductively coupled plasma mass spectroscopy (ICP-MS), and atomic absorption spectroscopy (AAS). Preferably, the ferric cation ($Fe^{3+}$) concentration is determined by inductively coupled plasma optical emission spectroscopy (ICP-OES). ICP-OES spectrometers, such as HORIBA Jobin-Yvon ULTIMA spectrometers, can be used for determining the ferric cation ($Fe^{3+}$) concentration. As attested by FIGS. 6 and 7 and Tables 2 and 3, iron-doped barium stannate materials having a ferric cation ($Fe^{3+}$) concentration of about 10 to about 500 ppm by weight exhibit at least 50% increase in the NIR integrated photoluminescence intensity in comparison to $BaSnO_3$ (samples C3 and C7). Moreover, iron-doped barium stannate materials having a ferric cation ($Fe^{3+}$) concentration of about 10 to about 500 ppm by weight exhibit a significantly higher NIR integrated photoluminescence intensity in comparison to iron-doped barium stannate materials having a $Fe^{3+}$ concentrations higher than 500 ppm (samples E8, E16, E17, E18 and E19).

Preferably, the ferric cation ($Fe^{3+}$) concentration by weight in the iron-doped barium stannate material described herein is of about 10 to about 300 ppm. As attested by FIGS. 6 and 7, an iron-doped barium stannate material having a ferric cation ($Fe^{3+}$) concentration of about 10 to about 300 ppm by weight present at least 100% increase in the NIR integrated photoluminescence intensity in comparison to $BaSnO_3$.

More preferably, the ferric cation ($Fe^{3+}$) concentration by weight in the iron-doped barium stannate material described herein is of about 20 to about 100 ppm. Iron-doped barium stannate material having a ferric cation ($Fe^{3+}$) concentration of about 20 to about 100 ppm, besides exhibiting at least 200% increase in the NIR integrated photoluminescence intensity in comparison to $BaSnO_3$ (see for e.g. FIG. 6), they exhibit also a higher photoluminescence intensity at any wavelength in the NIR-spectrum range in comparison to $BaSnO_3$.

Preferably, the iron-doped barium stannate material described herein is obtained by a solid-state process comprising the following steps:
i) addition of an appropriate volume of $Fe^{3+}$ solution to a mixture of $BaCO_3$ and $SnO_2$;
j) grinding the mixture of step i); and
k) calcination of the mixture obtained at step j).

As used herein, a "$Fe^{3+}$ solution" refers to a solution of one or more $Fe^{3+}$ precursors in a solvent. Preferably, the $Fe^{3+}$ precursor is selected from the group comprising ferric salts and hydrates thereof, ferrous salts and hydrates thereof, ferric and ferrous oxides. The ferrous cation oxidizes during the calcination step k) to provide the corresponding ferric cation. Suitable ferric salts include, but are not restricted to $Fe(NO_3)_3$, $FeCl_3$, $Fe(OAc)_3$, $[Fe_3O(OAc)_6(H_2O)_3]OAc$ and hydrates thereof. Preferably the solvent used for producing the $Fe^{3+}$ solution is selected from alcohols such as methanol, ethanol, propanol, isopropanol, water and mixtures thereof.

As used herein and obvious to the skilled person, the wording "appropriate volume of $Fe^{3+}$ solution" refers to a volume of $Fe^{3+}$ solution containing the amount of ferric ($Fe^{3+}$) or ferrous ($Fe^{3+}$) cation corresponding to the amount of ferric cation ($Fe^{3+}$) desired in the iron-doped barium stannate sample to be prepared.

It is also preferred that the calcination of step k) takes place at a temperature of between about 1000° C. and about 1600° C. for a period of between about 1 and about 48 hours (h), preferably of between about 1100° C. and about 1400° C. for a period of between about 2 and about 30 h, and even more preferably at a temperature of between about 1150° C. and about 1350° C. for between about 10 and about 20 h.

It is further preferred that the process comprising steps i), j) and k) is repeated at least twice, preferably thrice.

In a more preferred embodiment, the iron-doped barium stannate material described herein is obtained by a wet process comprising the following steps:
d) addition of an appropriate volume of $Fe^{3+}$ aqueous solution to a pre-stirred aqueous solution comprising $Ba^{2+}$ and $Sn^{4+}$;
e) addition of the aqueous solution of step d) to a NaOH aqueous solution, thereby causing the formation of the iron-doped $BaSn(OH)_6$ precipitate;

f) adjusting the pH of the suspension of step e) to about 11;

g) separation of the iron-doped $BaSn(OH)_6$ precipitate; and h) calcination of the iron-doped $BaSn(OH)_6$ precipitate.

As used herein, a "$Fe^{3+}$ solution" refers to a solution of one or more $Fe^{3+}$ precursors in a solvent. Preferably, the $Fe^{3+}$ precursor is selected from the group comprising ferric salts and hydrates thereof, ferrous salts and hydrates thereof, ferric and ferrous oxides. The ferrous cation oxidizes during the calcination step h) to provide the corresponding ferric cation. Suitable ferric salts include, but are not restricted to $Fe(NO_3)_3$, $FeCl_3$, $Fe(OAc)_3$, $[Fe_3O(OAc)_6(H_2O)_3]OAc$ and hydrates thereof. Preferably, the solvent used for producing the $Fe^{3+}$ solution is selected from alcohols such as methanol, ethanol, propanol, isopropanol, water and mixtures thereof.

As used herein the wording "appropriate volume of $Fe^{3+}$ aqueous solution" refers to a volume of $Fe^{3+}$ aqueous solution containing at least the amount of ferric ($Fe^{3+}$) or ferrous ($Fe^{3+}$) cation corresponding to the amount of ferric cation ($Fe^{3+}$) desired in the iron-doped barium stannate sample to be prepared, but preferably an amount of ferric ($Fe^{3+}$) or ferrous ($Fe^{2+}$) cation that is at least 10% lower and at the most 20% higher than the amount of ferric cation ($Fe^{3+}$) desired in the iron-doped barium stannate sample to be prepared.

Preferably, the pre-stirred aqueous solution comprising $Ba^{2+}$ and $Sn^{4+}$ is obtained by addition of a $Ba^{2+}$ salt, to a pre-stirred acid solution of $Sn^{4+}$, obtained by dissolving a $Sn^{4+}$ salt, such as $SnCl_4$ or hydrates thereof in an acid aqueous solution.

Preferably, the $Ba^{2+}$ salt is selected from the group comprising $BaCl_2$ and hydrates thereof, $Ba(NO_3)_2$ and hydrates thereof, $Ba(OAc)_2$ and hydrates thereof, $BaCO_3$, and $Ba(OH)_2$ and hydrates thereof.

It is further preferred that the pH of the suspension of step e) is adjusted at step f) to about 11 by addition of a NaOH or HCl aqueous solution. By adjusting the pH of the suspension of step e) to about 11, it is ensured at the formation of the $SnO_2$ side-product is avoided and consequently, the yield of iron-doped barium stannate material is increased (see Table 1).

It is also preferred that the separation of the iron-doped $BaSn(OH)_6$ precipitate is done by centrifugation.

Conveniently, the process for manufacturing the iron-doped barium stannate described herein further comprises step g1) conducted after step g) and before step h):

g1) washing of the iron-doped $BaSn(OH)_6$ precipitate separated at step g) with deionized water until the pH of the supernatant is about 7-10.

More preferably, the manufacturing process further comprises step g2) conducted after step g) or step g1) and before step h):

g2) drying the iron-doped $BaSn(OH)_6$ precipitate at a temperature of between about 80° C. and 250° C. for a period of between about 10 and 14 h, preferably of between 90° C. and 200° C. for a period of between 11 and 13 h.

It is further preferred that the calcination of step h) takes place at a temperature of between about 1000° C. and about 1600° C. for a period of between about 1 and about 48 hours (h), preferably of between about 1100° C. and about 1400° C. for a period of between about 2 and about 30 h, and even more preferably at a temperature of between about 1150° C. and about 1350° C. for between about 10 and about 20 h.

Figure 6:
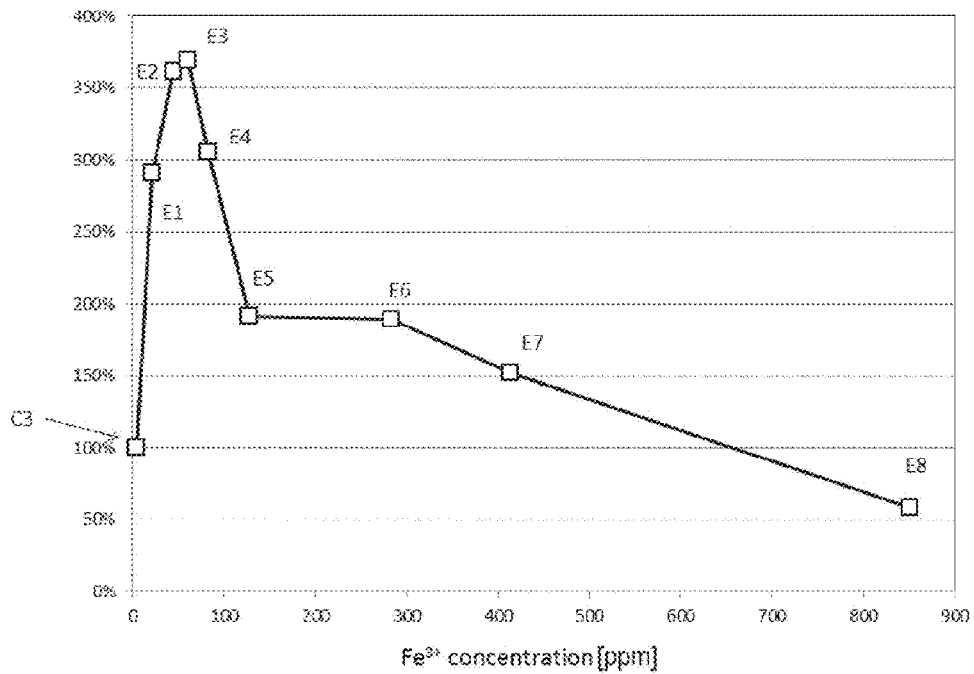
FIG. 6 shows a diagram of the integrated photoluminescence emission spectra intensities of $Fe^{3+}$ doped $BaSnO_3$ powders according to the present invention (samples E1-E7) in comparison to $BaSnO_3$ powders having a $Fe^{3+}$ concentration outside the concentration range claimed herein ("un-doped" $BaSnO_3$ powder having a $Fe^{3+}$ concentration of 4 ppm (sample C3), and $Fe^{3+}$ doped $BaSnO_3$ powder having a $Fe^{3+}$ concentration of 851 ppm (sample E8)) in function of the $Fe^{3+}$ concentration in the $BaSnO_3$ samples.
Figure 7:
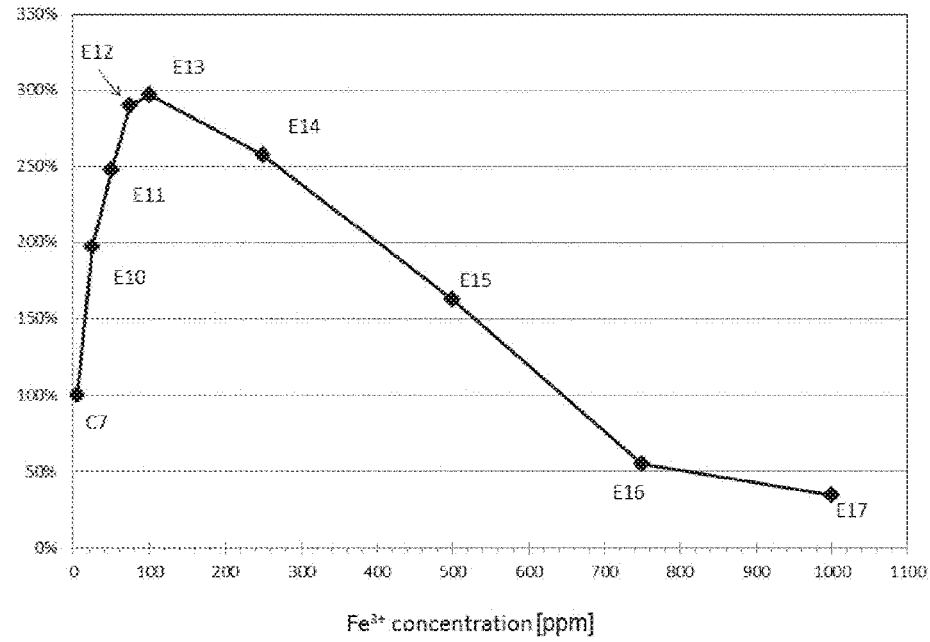
FIG. 7 shows a diagram of the integrated photoluminescence emission spectra intensities of $Fe^{3+}$ doped $BaSnO_3$ powders according to the present invention (samples E10-E15) in comparison to $BaSnO_3$ powders having a $Fe^{3+}$ concentration outside the concentration range claimed herein ("un-doped" $BaSnO_3$ powder having a $Fe^{3+}$ concentration of 5 ppm (sample C7), $Fe^{3+}$ doped $BaSnO_3$ powder having a $Fe^{3+}$ concentration of 750 ppm (sample E16), $Fe^{3+}$ doped $BaSnO_3$ powder having a $Fe^{3+}$ concentration of 1000 ppm (sample E17)) in function of the $Fe^{3+}$ concentration in the $BaSnO_3$ samples.

As demonstrated by FIG. 6 and FIG. 7, the iron-doped barium stannate materials obtained by the above-described wet process exhibit significantly increased integrated photoluminescence intensity in comparison to the iron-doped barium stannate materials obtained by the solid-state process.

The iron-doped barium stannate material described herein is preferably a particulate material with particles having a small average size, conveniently from about 0.3 µm to about 10 µm, preferably from about 0.5 µm to about 5 µm. Particle size distributions can be measured using a Microtrac S3500 Bluewave Particle Size Analyzer and Sample Delivery Controller via analysis of scattered laser light diffracting from the sample and projected onto an optical detector array. For this analysis, the samples are prepared as a water suspension, using for example a Branson Sonifier 450. Particles having an average particle size lower than 5 µm are particularly useful for the production of transparent security features that cannot be discriminated at a first glance. To obtain such materials, the manufacturing processes described above comprise preferably step l) conducted after step h) or k), respectively:

l) sieving the calcined precipitate obtained at step h) or k).

The iron-doped barium stannate particulate material described herein has preferably a narrow particle size distribution, such that the majority of the particles have substantially the same size. In a preferred embodiment the particles have a particle size distribution defined by d(0.9) from about 3 to about 15 µm, preferably from about 3 to about 10 µm, and more preferably from about 4 to about 7 µm.

Another aspect according to the present invention is directed to a photoluminescent security ink composition comprising the iron-doped barium stannate material described herein. Such photoluminescent ink composition is particularly useful for the production of a high-security covert security feature requiring the use of special equipment for inducing and detecting its photoluminescence.

The photoluminescent security ink composition may further comprise one or more coloring agents, such as dyes, organic pigments, inorganic pigments and mixtures thereof. Advantageously, the one or more coloring agents optionally contained by the photoluminescent security ink do not interfere with the photoluminescence of the iron-doped barium stannate material i.e. do not decrease the photoluminescence intensity at one or more predefined wavelengths in the NIR-spectrum range and/or the NIR integrated photoluminescence intensity of the iron-doped barium stannate described herein.

Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of dyes include without limitation coumarines, cyanines, oxazines, uranines, phtalocyanines, indolinocyanines, triphenyimethanes, naphtalocyanines, indonanaphtalo-Metal dyes, anthraquinones, anthrapyridones, azo dyes, rhodamines, squarilium dyes, and croconium dyes. Conveniently, the selected dyes do not absorb in the range from about 800 nm to about 1050 nm and do not interfere with the photoluminescence of the iron-doped barium stannate material i.e. do not decrease the photoluminescence intensity at one or more predefined wavelengths in the NIR-spectrum range and/or the NIR integrated photoluminescence intensity of the iron-doped barium stannate described herein, for e.g. by quenching said photoluminescence or chemically reacting with said material.

Pigments suitable for inks are known in the art and are preferably selected from the group comprising inorganic pigments, organic pigments and mixtures thereof. Typical examples of pigments include without limitation metal oxides, mixed metal oxides, azo pigments, azomethines, methines, anthraquinones, phthalocyanines, perinones, perylenes, diketopyrrolopyrroles, thioindigo pigments, thiazinindigo pigments, dioxazines, iminoisoindolinones, quinacridones, flavanthrones, indanthrones, anthrapyrimidines and quinophthalone pigments and mixtures thereof. Conveniently, the selected pigments do not absorb electromagnetic radiation in the range from about 800 nm to about 1050 nm and do not interfere with the photoluminescence of the iron-doped barium stannate material i.e. do not decrease the photoluminescence intensity at one or more predefined wavelengths in the NIR-spectrum range and/or the NIR integrated photoluminescence intensity of the iron-doped barium stannate described herein, for e.g. by quenching said photoluminescence or chemically reacting with said material.

The photoluminescent security ink composition described herein may further comprise one or more photoluminescent substances absorbing in the UV-spectrum range and emitting in the VIS-spectrum range.

A security feature made with the photoluminescent security ink composition comprising the iron-doped barium stannate described herein and one or more photoluminescent substances absorbing in the UV-spectrum range and emitting in the VIS-spectrum range provides an increased resistance to counterfeit.

Such security feature is meanwhile semi-covert and can be authenticated by the human eye upon illumination of said security feature with UV light, and covert and can be authenticated only with a detecting or reading device upon illumination of said security feature with UV light and measurement of the spectral parameters of the radiation emitted by the security feature.

Preferably, the one or more photoluminescent substances absorbing in the ultraviolet-spectrum range and emitting in the visible-spectrum range are selected from the group comprising: fluorescent dyes, such as those described for e.g. by "Organic Luminescent Materials", B. M. Krasovitskii 8, B. M. Bolotin, 1988, VCH Verlagsgesellschaft and the U.S. Pat. No. 5,135,569, fluorescent pigments, such as those described for e.g. by the U.S. Pat. No. 8,123,848 B2 and the U.S. Pat. No. 5,470,502, undoped or doped rare earths oxides, oxysulfides or sulfides, such as those described for e.g. by the European patent no. EP 0985007 B1, the U.S. Pat. No. 6,180,029 B1 and the U.S. Pat. No. 7,922,936 B2, lanthanide organo-complexes, such as those described for e.g. by *Coord. Chem. Rev.* 2015, 293-94, 19-47, quantum dots, such as those described for e.g. by the US patent application US 20070225402 A1, fluorescent nano systems, such as those described for e.g. by the international patent application WO 2012172018 A1, fluorescent brighteners, such as those described for e.g. by the international patent application WO 02055646 A1 and the U.S. Pat. No. 4,153,593.

Conveniently, the one or more photoluminescent substances absorbing in the ultraviolet-spectrum range and emitting in the visible-spectrum range do not absorb electromagnetic radiation in the range from about 800 nm to about 1050 nm and do not interfere with the photoluminescence of the iron-doped barium stannate material i.e. do not decrease the photoluminescence intensity at one or more predefined wavelengths in the NIR-spectrum range and/or the NIR integrated photoluminescence intensity of the iron-doped barium stannate described herein, for e.g. by quenching said photoluminescence or chemically reacting with said material.

The photoluminescent security ink composition described herein may further comprise one or more machine readable materials selected from the group consisting of magnetic materials, electrically conductive materials, infrared-absorbing materials and combinations or mixtures thereof. As used herein, the term "machine readable material" refers to a material which exhibits at least one distinctive property which is detectable by a device or a machine, and which can be comprised in a layer so as to confer a way to authenticate said layer or article comprising said layer by the use of particular equipment for its authentication.

The photoluminescent security ink composition described herein may further comprise one or more forensic markers and/or one or more taggants.

The photoluminescent ink composition described herein may further comprise one or more additives (for e.g. hinders, dispersing agents, wetting agents, rheology modifiers, photostabilizers, and the like) that do not diminish or decrease the NIR emission intensity emanating torn the ink composition, and a liquid carrier.

It is important to select only those additives, in particular binders, which do not interfere with the activating radiation or with the emission radiation. It is also desirable that the chosen additives, in particular binders, should have minimal impact on the emission intensity, i.e. they should not exhibit any significant quenching of the photoluminescence. Preferably, the binder resins are transparent in the VIS-spectrum range, thereby ensuring the production of transparent covert security features that cannot be noticed by the human eye.

Depending on the process used to apply the photoluminescent ink compositions described herein and the process to harden a layer made of said photoluminescent ink compositions described heroin, said photoluminescent ink compositions may be selected from the group consisting of oxidative drying ink compositions, radiation curable ink compositions (including UV-VIS curable ink compositions), thermal drying ink compositions, and combination thereof.

Depending on the process used to apply the photoluminescent ink compositions described herein, said photoluminescent ink compositions may further comprise one or more additives, where said one or more additives include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the photoluminescent ink compositions described herein in amounts and in forms known in the art, including so-called nano-materials where at least one of the dimensions of the additive is in the range of 1 to 1000 nm.

The photoluminescent security ink compositions described herein May be prepared by dispersing. Mixing and/or milling all the ingredients forming liquid or pasty inks.

Preferably, the concentration of iron-doped barium stannate material in the photoluminescent security ink composition is of between about 1 to about 25 wt-%, preferably of between about 2 to about 20 wt-% and even more preferably of between about 5 to about 17 wt-%, the weight percent being based on the total amount of the photoluminescent security ink composition.

The photoluminescent security ink compositions described herein are applied by a coating or printing process. Preferably, the photoluminescent security inks compositions described herein are applied by a printing process selected from the group consisting of inkjet printing, screen printing, flexography printing, (rote)gravure, intagio printing (also known in the art as copperplate steel die printing) and offset printing. More preferably, the ink compositions described herein are applied by inkjet printing, screen printing, intaglio printing or offset printing, and even mom preferably by inkjet printing or offset printing.

A further aspect according to the present invention relates to the use of the photoluminescent security ink composition described herein for the production of a covert security ink, as well as to a security feature made: with the photoluminescent security ink composition described herein.

Preferably, the security feature described herein is VIS-transparent i.e. has a total light transmittance of at least 80%, preferably of at least 85% and even more preferably of at least 90%, and therefore, not noticeable by the naked eye, its authentication being possible only with a detecting or reading device upon illumination of the security feature with UV light and measurement of the spectral parameters of the radiation emitted by the security feature.

More preferably, the security feature described herein is transparent to VIS-light and therefore, not detectable by the naked eye, but its authentication is possible by the human eye upon illumination of the security feature with UV light and with a IR-detecting or IR-reading device upon illumination of the security feature with UV light and measurement of the spectral parameters of the radiation emitted by the security feature.

Owing to the improved optical properties of the iron-doped barium stannate material described herein, security features presenting very low weight concentration of iron-doped barium stannate material can be produced.

In a preferred embodiment, the security feature described herein is obtained by applying as described herein on the substrate described herein the photoluminescent security ink composition described herein so as to form a photoluminescent security ink layer, and hardening the photoluminescent security ink layer.

Suitable substrates for the present invention include without limitation paper or other fibrous materials, such as cellulose, paper-containing materials, plastic or polymer substrates, composite material's, metals or metalized materials, glasses, ceramics and combinations thereof. Typical examples of plastic or polymer substrates are substrates made of polypropylene (PP), polyethylene (PE), polycarbonate (PC), polyvinyl chloride (PVC) and polyethylene terephthalate (PET). Typical examples of composite materials include without limitation multilayer structures or laminates of paper and at least one plastic or polymer material, such as those described above as well as plastic and/or polymer fibers incorporated in a paper-like or fibrous material such as those described above. With the aim of further increasing the security level and the resistance against counterfeiting and illegal reproduction of security documents, the substrate may contain watermarks, security threads, fibers, planchettes, luminescent compounds, windows, foils, decals, coatings and combinations thereof, provided that said additional security feature do not diminish the NIR emission intensity emanating from the iron-doped barium staminate material described herein.

The substrate described herein onto which the photoluminescent security ink compositions described herein are applied may consist in an intrinsic part of a security document or security article, or alternatively, the photoluminescent security ink compositions described herein are applied onto an auxiliary substrate, such as for example a security thread, security stripe, a foil, a decal or a label and subsequently, transferred to a security document or article including in a separate step.

The photoluminescent security ink layer described herein may be hardened by hardening methods well known to the skilled person. The hardening step generally may be any step that increases the viscosity of the ink composition such that e substantially solid material adhering to the substrate is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the security ink. Such a chemical reaction may be initiated by heat or IR irradiation as outlined above for the physical hardening processes, but may preferably include the initiation of a chemical reaction by a radiation mechanism including without limitation radiation curing including ultraviolet-visible light radiation curing and electronic beam radiation curing, preferably ultraviolet-visible light radiation curing; oxypolymerization (oxidative reticulation, typically induced by a joint action of oxygen and one or more catalysts, such as cobalt-containing, trianganese-containing and vanadium-containing catalysts); cross-linking reactions or any combination thereof. Consequently and as described herein, the photoluminescent security ink composition described herein may be selected from the group consisting of radiation curable ink compositions, thermal drying ink compositions, oxidatively drying intaglio ink composition and combinations thereof.

In a preferred embodiment, the security feature described herein is an indicium, an image, a pattern or a graphic element for authentication purposes. Indicium includes without limitation symbols, motifs, letters, words, numbers, logos and drawings.

A further embodiment according to the present invention is directed to a process for manufacturing the security feature described herein comprising the following steps:
  applying as described herein on the substrate described herein the photoluminescent security ink composition described herein so as to form a photoluminescent security ink layer, and
  hardening as described herein the photoluminescent security ink layer.

A further aspect according to the present invention is directed to a security document or article comprising one or more security features, such as those described herein. As mentioned above, security documents and security articles are documents and articles having a value such as to render them potentially liable to attempts at counterfeiting or illegal reproduction and which are usually protected against counterfeit or fraud by at least one security feature.

Examples of security documents include without limitation value documents and value commercial goods.

Typical examples of value documents include without limitation banknotes, deeds, tickets, checks, vouchers, fiscal stamps, tax labels, agreements and the like, identity documents such as passports, identity cards, visas, bank cards, credit cards, transaction cards, access documents, entrance tickets and the like. Value commercial goods encompass packaging material, in particular for cosmetic articles, nutraceutical articles, pharmaceutical articles, alcohols, tobacco articles, beverages or foodstuffs, electrical/electronics articles, fabrics or jewelry, i.e. articles that shall be protected against counterfeiting and/or illegal reproduction in order to warrant the content of the packaging like for instance genuine drugs. Packaging material examples include without limitation labels, such as authentication brand labels, tamper evidence labels and seals.

Thus, a preferred embodiment pertains to a banknote, a deed, a ticket, a check, a voucher, a fiscal stamp, a tax label, an agreement, an identity document, an access document, or a packaging material for cosmetic articles, nutraceutical articles, pharmaceutical articles, alcohols, tobacco articles, beverages, foodstuffs, electrical/electronics articles, fabrics or jewelry, comprising one or more security features described herein.

As mentioned above, a security article encompasses all articles that shall be protected against counterfeiting and/or illegal reproduction in order to warrant their content;

Security articles include, but are not restricted to articles made of glass, such as bottles, articles made of metal, such as cans, bottle caps, jewelry articles, articles made of ceramic, etc.

A further aspect according to the present invention is directed to a process of manufacturing the security document or article described herein, said process comprising the steps of applying as described herein the photoluminescent security ink composition described on the security document or article described herein so as to form the photoluminescent security ink layer described herein and hardening as described herein said photoluminescent security ink layer.

A further embodiment according to the present invention is directed to a method for authenticating a security document or security article comprising one or more security features described herein comprising the steps:
  a) illuminating one or more security features on the security document or security article described herein with ultraviolet light i.e. with an electromagnetic radiation with one or more wavelengths of between about 10 nm to about 400 nm;
  b) measuring the spectral parameters of the radiation emitted by the one or more security features in response to the illumination with the ultraviolet light; and
  c) determining the authenticity of the security document or article.

Preferably, the ultraviolet light used at step a) has one or more wavelengths of between about 300 nm to about 390 nm, more preferably from 330 nm to about 390 nm, and even more preferably of between about 360 nm to about 390 nm.

The step b) of the authentication method i.e. measuring the spectral parameters of the radiation emitted by the one or more security features in response to the illumination with the ultraviolet light preferably comprises:
  measuring the intensity of the radiation emitted by one or more security features at one or more predefined near infrared wavelengths, and/or
  the integrated intensity spectra of the radiation emitted by the one or more security features between two predefined near infrared wavelengths, and/or
  the decay property of the emitted radiation.

Hence, during the detection step h) at least one, at least two or at least three spectral parameters of the radiation emitted by the one or more security features in response to the illumination with the ultraviolet light are measured.

Thus, the measured spectral parameter of the radiation emitted by the security feature might be the intensity of the radiation emitted by the security feature upon illumination with ultraviolet light at one or more predefined wavelengths in the near infrared spectrum range. The one or more predefined wavelengths are comprised between 800 and 1100 nm, preferably between 800 and 1000 nm, and even more preferably between 850 and 950 nm.

Alternatively, the measured spectral parameter of the radiation emitted by the security feature might be the integrated intensity spectra of the radiation emitted by the security feature between two predefined near infrared wavelengths, preferably between 700 and 1100 nm.

Furthermore, the measured spectral parameter of the radiation emitted by the security feature might be the decay property of the emitted radiation. In order to measure the decay property of the emitted radiation it is sufficient to monitor the intensity of the emitted radiation at a least one or more near infrared wavelengths in function of time. Preferably, the delay property measured at step b) of the authentication method is selected from the amount of time required by the radiation emitted by the security feature in response to the illumination with ultraviolet light to decay to a predetermined percentage of the initial intensity value of said emitted radiation, the amount of time it takes for the radiation emitted by the security feature in response to the illumination with ultraviolet light to decay from a first predetermined percentage of the initial intensity value of said emitted radiation to a second predetermined percentage of said initial intensity value, and the amount of time it takes for the radiation emitted by the security feature in response to the illumination with the ultraviolet light to decay from a first intensity value of said emitted radiation to a predetermined percentage of the initial intensity value of said emitted radiation. As the radiation emitted by a photoluminescent material in response to illumination with excitation light and upon removal of the excitation light source, usually decays exponentially according to the following equation:

$$I = Ae^{-time/\tau} + B$$

with I being the intensity of the emitted radiation, $\tau$ being the decay constant and A and B being constants, it is further preferred that the decay property measured at step b) of the authentication method is the decay constant $\tau$.

The authenticity and genuineness of the security document or security article is determined by simply comparing the spectral parameter(s) measured at step b) with the spectral parameters range of the authenticating security feature according to the present invention. When the detected spectral parameter(s) is/are within the authenticating spectral parameters range, the security document or security article is deemed to be authentic and genuine. Conversely, when the detected spectral parameter(s) fail(s) to fall within the authenticating spectral parameters range, the document or the article is deemed to be unauthentic (i.e. forged or counterfeited).

A method for authenticating a security document or security article comprising one or more security features as described herein comprising the steps:
  a) illuminating the one or more security features on the security document or security article described herein with ultraviolet light having one or more wavelengths of between of between about 300 nm to about 390 nm, more preferably from 330 nm to about 390 nm, and even more preferably of between about 360 nm to about 390 nm;

b) measuring the integrated intensity spectra of the radiation emitted by the one or more security features between two predefined near infrared wavelengths, preferably between 700 and 1100 nm; and c) determining the authenticity of the security document or article, is particularly preferred.

A further preferred method for authenticating a security document or security article comprising one or more security features as described herein comprises the steps:

a) illuminating the one or more security features on the security document or security article described herein with ultraviolet light having one or more wavelengths of between of between about 300 nm to about 390 nm, more preferably from 330 nm to about 390 nm, and even more preferably of between about 360 nm to about 390 nm;

b) measuring the decay property of the emitted radiation; and c) determining the authenticity of the security document or article.

EXAMPLES

The present invention is now described in greater detail with respect to non-limiting examples.

The reagents were obtained from the following suppliers;
SnCl$_4$.5H$_2$O 98% from Alfa Aesar;
BaCl$_2$.2H$_2$O 99+% from Alfa Aesar;
BaCO$_3$≤99% from Sigma-Aldrich;
SnO$_2$ 97% from Sigma-Aldrich;
Fe(NO$_3$)$_3$H$_2$O ACS grade from Prochem;
NaOH 10N solution from J T Baker.

The powders were characterized by X-ray diffraction (XRD) with a Bruker D8 Advance instrument operating with Cu Kα line.

Fe$^{3+}$ concentration was measured by ICP-OES with a Horiba Jobin-Yvon Ultima.

The photoluminescence (PL) spectra were measured with a PTI spectro-fluoreneter QuantaMaster QM-400 equipped with a Xenon arc lamp and a cooled NIR PMT detector (Hamamatsu R5108 400-1200 nm). The integrated photoluminescence values were obtained by integrating the photoluminescence emission spectra in the range from 700 nm to 1100 nm.

Particle size distributions were measured using a Microtrac S3500 Bluewave Particle Size Analyzer and Sample Delivery Controller. The samples were prepared as a water suspension and were measured via the analysis of scattered laser light diffracting from the sample and projected onto an optical detector array.

The sample suspensions were prepared using a Branson Sonifier 450 (0.25 g of powder sample, about 0.1 g of Daman C dispersant, and deionized water to reach a total of 50 g, sonicated for 3 minutes of total elapsed time at 50% duty cycle and 60% amplitude).

I. Synthesis of the Iron-Doped Barium Stannate Materials
I.A Synthesis of the Iron-Doped Barium Stannate Materials Via a Wet Process
I.A.1 Optimization of Manufacturing Wet Process Conditions. Synthesis of BaSnO$_3$ Samples C1-C6.

SuCl$_4$.5H$_2$O (29.01 g, 82.2 mmol) was added to a solution of 12 ml of conc. HCl in 125 ml of water yielding a clear Sn(IV) solution which was stirred for 1 hour at room temperature. BaCl$_2$.2H$_2$O (22.14 g, 90.4 mmol) was added and the solution was stirred for 15 minutes. Dropwise addition of the obtained solution to a NaOH solution (204 ml; NaOH concentration: see Table 1) at room temperature under vigorous stirring led to BaSn(OH)$_6$ precipitation. The pH of the solution was adjusted with NaOH solution or HCl solution to the values described by Table 1. The suspension was aged for 1.5 hours under slow stirring. The precipitate was centrifuged at 1250 rpm for 30 minutes and washed with deionized water until the pH of the supernatant was about 7-8. Centrifugation was run on a Thermoforma GPBR equipped with 6×500 ml jars.

The washed BaSn(OH)$_6$ precipitate was dried in an oven at 95° C. overnight. The product was calcined at 1350° C. for 20 hours under air in an alumina crucible and subsequently, sieved at 325 mesh to provide target BaSnO$_3$ (samples C1-C6).

The reaction yield of BaSnO$_3$ versus SnO$_2$ in % was calculated as 1/(1+R), wherein R was the ratio of SnO$_2$ versus BaSnO$_3$ in the calcined powder; R was calculated by dividing the intensity of the most intense peak (a1, FIG. 1) of SnO$_2$ (at 2θ=26.6°) in the XRD diffractogram by the intensity of the most intense peak (b1, FIG. 1) of BaSnO$_3$ (at 2θ=30.7°).

TABLE 1

Reaction yield and ratio of BaSnO$_3$ versus SnO$_2$.

| Sample no. | NaOH solution [mol/l] | Final pH of precipitation solution | Yield[a] | % BaSnO$_3$ | % SnO$_2$ | Ratio R SnO$_2$/ BaSnO$_3$ |
|---|---|---|---|---|---|---|
| C1 | 2.75 | 7.7 | 58 | 46 | 54 | 1.19 |
| C2 | 3 | 10.1 | 82 | 98 | 2 | 0.02 |
| C3 | 3 | 11.0 | 85 | 100 | 0 | 0 |
| C4 | 3 | 12.1 | 79 | 100 | 0 | 0 |
| C5 | 3 | 13.0 | 72 | 100 | 0 | 0 |
| C6 | 8 | >14 | 53 | 100 | 0 | 0 |

[a]Yield obtained by weighting the obtained product i.e. the mixture of BaSnO$_3$ and SnO$_2$ (samples C1-C2) or the pure BaSnO$_3$ (samples C3-C6).

I.A.2 Synthesis of Iron-Doped Barium Stannate Samples (E1-E9) Having Different Concentrations of Ferric Cation A 200 ppm (by weight) Fe$^{3+}$ stock solution was prepared by dissolving Fe(NO$_3$)$_3$.9H$_2$O (0.7246 g, 1.8 mmol) in water (500 ml).

SnCl$_4$.5H$_2$O (29.01 g, 82.2 mmol) was added to a solution of 12 ml of conc. HCl in 125 ml of water yielding a clear Sn(IV) solution which was stirred for 1 hour at room temperature. BaCl$_2$.2H$_2$O (22.14 g, 90.4 mmol) was added and the solution was stirred for 15 minutes. The obtained solution was treated under stirring with a variable volume of Fe$^{3+}$ stock solution so that to obtain the theoretical concentration of Fe$^{3+}$ (calculated for a 100% yield of BaSnO$_3$) summarized by Table 2.

Dropwise addition of the obtained solution to a 4N NaOH solution (204 ml) at room temperature under vigorous stirring led to iron-doped BaSn(OH)$_6$ precipitation. The pH of the solution was adjusted with NaOH solution or HCl solution to about 11. The suspension was aged for 1.5 hours under slow stirring. The precipitate was centrifuged at 1250 rmp for 30 minutes and washed with deionized water until the pH of the supernatant was about 7-8.

The washed iron-doped BaSn(OH)$_6$ precipitate was dried in an oven at 95° C. overnight. The product was calcined at 1350° C. for 20 hours under air in an alumina crucible and sieved at 325 mesh to yield the target iron-doped BaSnO$_3$ (samples E1-E9). The concentration of Fe$^{3+}$ in iron-doped BaSnO$_3$ samples E1-E9, as well as in the BaSnO$_3$ sample C3 was measured by ICP-OES. The theoretical values of added Fe$^{3+}$ as well as the concentration of Fe$^{3+}$ in the samples E1-E9 and C3 as measured by ICP-OES are listed in Table 2.

The listed measured value of the $Fe^{3+}$ concentration represents the average of 3 measurements.

As illustrated by Table 2, the dopant $Fe^{3+}$ concentration reached a maximum average value of about 840 ppm when 1000 ppm or more was added during the synthesis (see Table 2, samples E8 and E9).

Figure 3:
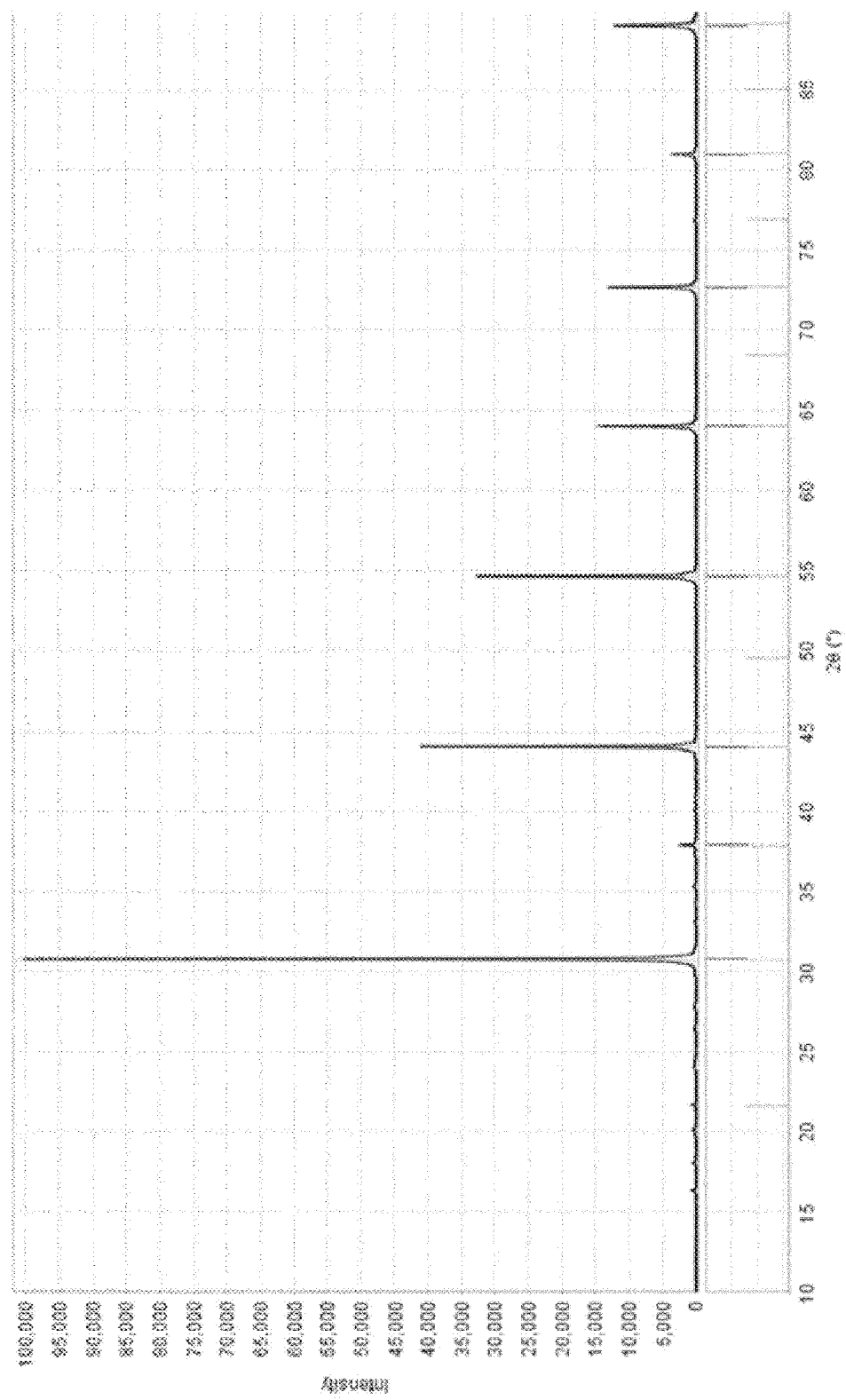
FIG. 3 shows the XRD diffractogram of a $Fe^{3+}$ doped $BaSnO_3$ powder according to the present invention (sample E2 having a $Fe^{3+}$ concentration of 45 ppm).
Figure 4:
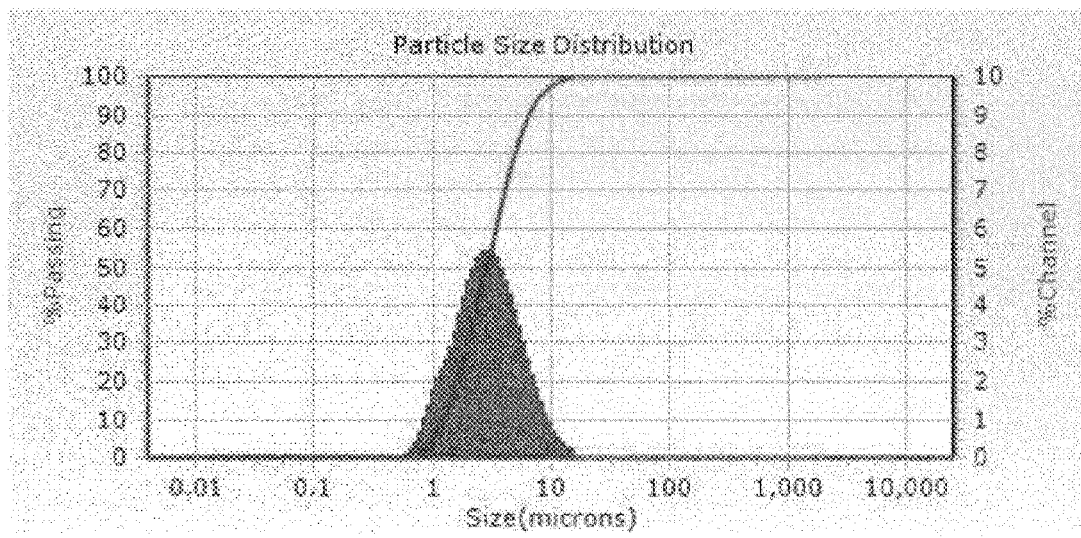
FIG. 4 shows the particles size distribution of a $Fe^{3+}$ doped $BaSnO_3$ powder according to the present invention (sample E2 having a $Fe^{3+}$ concentration of 45 ppm).
Figure 5:
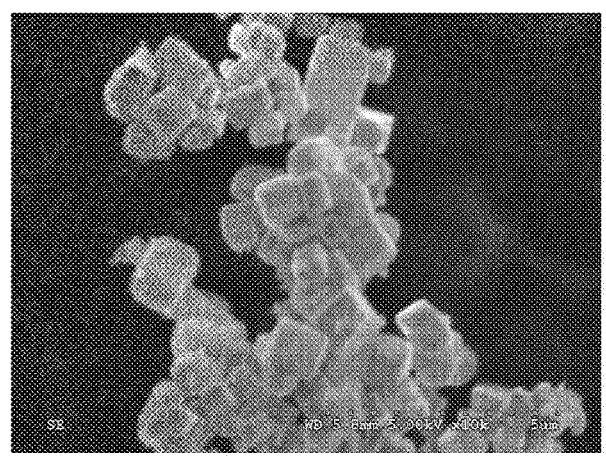
FIG. 5 shows a SEM microscope picture of particles of a $Fe^{3+}$ doped $BaSnO_3$ powder according to the present invention (sample E2 having a $Fe^{3+}$ concentration of 45 ppm).

The emission spectrum of the iron-doped $BaSnO_3$ sample (E1-E9) was measured (for e.g., the iron-doped) $BaSnO_3$ sample (E2) shows a maximum et about 890 nm). FIG. 3 shows the XRD diffractogram of the iron-doped $BaSnO_3$ sample (E2). The particles size and size distribution of the iron-doped $BaSnO_3$ sample (E2) were measured (see FIG. 4, d(0.5)=3.44 μm and d(0.9)=7.26 μm). FIG. 5 shows a SEM microscope picture of the particles of the iron-doped $BaSnO_3$ sample (E2).

FIG. 6 shows a comparison between the integrated photoluminescence intensity for the iron-doped $BaSnO_3$ samples E1-E8 and the $BaSnO_3$ sample C3 prepared by the wet process. The integrated photoluminescence intensity of the $BaSnO_3$ sample C3 was set to 100% and used as normalizing reference for integrated photoluminescence intensity of the iron-doped $BaSnO_3$ samples E1-E8.

Table 2 further lists the values of the integrated NIR photoluminescence intensity of the samples C3 and E1-E8 upon excitation at 365 nm.

TABLE 2

Integrated NIR photoluminescence intensity upon excitation at $\square_{exc}$ = 365 nm

| Sample no. | Theoretical value of added $Fe^{3+}$ [ppm] | Measured value of $Fe^{3+}$ by ICP-OES [ppm] | Integrated photoluminescence intensity |
|---|---|---|---|
| C3 | — | 4[a] | 100[b] |
| E1 | 20 | 22 | 291 |
| E2 | 50 | 45 | 362 |
| E3 | 75 | 61 | 369 |
| E4 | 100 | 82 | 306 |
| E5 | 150 | 128 | 192 |
| E6 | 300 | 283 | 189 |
| E7 | 500 | 414 | 152 |
| E8 | 1000 | 851 | 59 |
| E9 | 5000 | 832 | |

[a] The measured value of 4 ppm of $Fe^{3+}$ in sample C3 results from the native $Fe^{3+}$ impurity in the precursor materials and from the contamination from the process.
[b] Integrated photoluminescence intensity of the $BaSnO_3$ sample C3 was set to 100% and the integrated photoluminescence intensities of the iron-doped $BaSnO_3$ samples E1-E8 were normalized accordingly.

I.B Synthesis of the Iron-Doped Barium Stannate Materials (Samples E10-E19) Via a Solid-State Process A 500 ppm $Fe^{3+}$ stock solution was prepared by dissolving $Fe(NO_3)_3 \cdot 9H_2O$ (0.362 g, 0.896 mmol) in ethanol (100 ml).

$BaCO_3$ (3.25 g, 16.4 mmol) and $SnO_2$ (2.22 g, 16.4 mind) were mixed in an alumina crucible. A variable volume of the 500 ppm $Fe^{3+}$ stock solution was added (please refer to Table 3 for the concentrations of $Fe^{3+}$ in the iron-doped $BaSnO_3$ samples E10-E19). The resulting mixture was ground by hand in an alumina crucible, calcined at 1150° C. for 20 hours; this process was repeated 3 times yielding iron-doped $BaSnO_3$ (samples E10-E19). The iron-doped $BaSnO_3$ samples E10-E19 were characterized by XRD (phase purity), $BaSnO_3$ sample C7 was prepared in a similar way as the iron-doped $BaSnO_3$ samples E10-E19 except that no $Fe^{3+}$ stock solution was added to the mixture.

Table 3 lists the theoretical values of added $Fe^{3+}$ and the concentration of $Fe^{3+}$ in the sample C7 as measured by ICP-OES. The listed measured value of the $Fe^{3+}$ concentration represents the average of 3 measurements.

Figure 8:
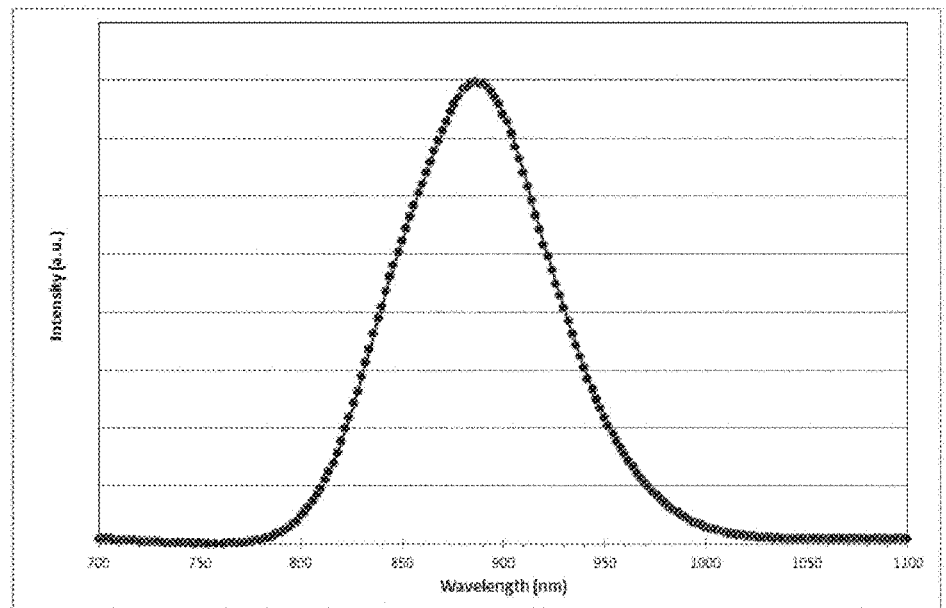
FIG. 8 shows the photoluminescence emission spectra of a $Fe^{3+}$ doped $BaSnO_3$ powder according to the present invention (sample E13 having a $Fe^{3+}$ concentration of 100 ppm).

The emission spectrum of the iron-doped $BaSnO_3$ sample (E10-E19) was measured. FIG. 8 shows the photoluminescence emission spectra of the iron-doped $BaSnO_3$ sample (E13)

Table 3 further lists the values of the integrated NIR photoluminescence intensity of the samples C7 and E10-E19 upon excitation at 365 nm. The integrated photoluminescence intensity of the $BaSnO_3$ sample C7 was set to 100% and used as normalizing reference for integrated photoluminescence intensity of the iron-doped $BaSnO_3$ samples E10-E19, FIG. 7 shows a comparison between the integrated photoluminescence intensity for the iron-doped $BaSnO_3$ samples E10-E17 and the $BaSnO_3$ sample C7 prepared by the solid-state process.

TABLE 3

Integrated NIR photoluminescence intensity upon excitation at $\square_{exc}$ = 365 nm

| Sample no. | Theoretical value of added $Fe^{3+}$ [ppm] | Measured value of $Fe^{3+}$ by ICP-OES [ppm] | Integrated photoluminescence intensity |
|---|---|---|---|
| C7 | — | 5[a] | 100[b] |
| E10 | 25 | | 197 |
| E11 | 50 | | 248 |
| E12 | 75 | | 290 |
| E13 | 100 | | 297 |
| E14 | 250 | | 258 |
| E15 | 500 | | 163 |
| E16 | 750 | | 55 |
| E17 | 1000 | | 35 |
| E18 | 20000 | | 40 |
| E19 | 50000 | | 33 |

[a] The measured value of 5 ppm of $Fe^{3+}$ in sample C7 results from the native $Fe^{3+}$ impurity in the precursor materials and from the contamination from the process.
[b] Integrated photoluminescence intensity of $BaSnO_3$ sample C7 was set to 100% and the integrated photoluminescence intensities of iron-doped barium stannate samples E10-E17 were normalize accordingly.

II. Preparation of Photoluminescent Inks Containing the Iron-Doped Barium Stannate and Security Features Thereof II.A Preparation of Photoluminescent Inks E1b-E8b and C3b A photoluminescent ink (E1b-E8, C3b) having the composition described by Table 4 was prepared as follows: a mixture of iron-doped barium stannate (samples E1-E8) or $BaSnO_3$ (sample C3), VINNOL E 22/48, DOWANOL DPM and UCAR Ester EEP was mixed at room temperature with a speedmixer (DAC 150 FVZ-K from Flacktek Inca and three zirconia beads (5 mm) at 3200 rpm for 6 min.

TABLE 4

Photoluminescent ink composition

| Ingredients | Composition [wt-%] |
|---|---|
| vinyl chloride copolymer, (VINNOL E 22/48, Wacker Chemie) | 18 |
| (2-methoxy-methylethoxy)-propanol (DOWANOL DPM, Brenntag Schweizerhall) | 19 |
| ethyl 3-ethoxypropionate (UCAR Ester EEP, Brenntag Schweizerhall) | 55 |
| iron-doped barium stannate samples E1-E8 or $BaSnO_3$ sample C3 | 8 |

II.B Preparation of Security Features E1a-E8a and C3a Made with the Photoluminescent Inks E1b-E8b and C3b, Respectively.

The security features E1a-E8a and C3a were prepared by applying the photoluminescent ink obtained at item II.A above on a polymer substrate (bi-oriented polypropylene, BOPP) using a drawdown bar at 80 μm so that to obtain a photoluminescent ink layer and drying said layer at room temperature for about 4 hours.

The photoluminescence of the security features E1a-E8a and C3a was measured with a spectrofluorimeter. Table 5 lists the values of the integrated NIR photoluminescence intensity of the security features E1a-E8a and C3a upon excitation at 365 nm. The integrated photoluminescence intensity obtained from the security feature C3a was set to 100% and used as normalizing reference for integrated photoluminescence intensity of the iron-doped $BaSnO_3$ samples E1a-E8a.

Figure 9:
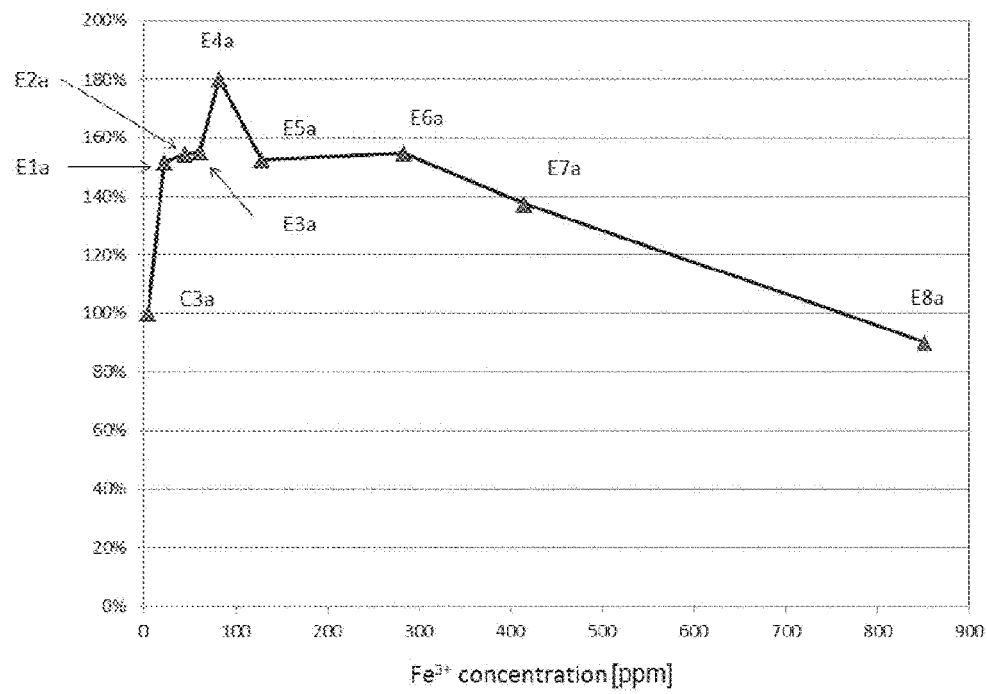
FIG. 9 shows a diagram of the integrated photoluminescence emission spectra intensities of security features according with the present invention (samples, E1a-E7a prepared with inks containing the inventive $Fe^{3+}$ doped $BaSnO_3$ samples E1-E7) in comparison with security feature prepared with inks containing $BaSnO_3$ powders having a $Fe^{3+}$ concentration outside the concentration range claimed herein (sample C3a prepared with a ink containing the "un-doped" $BaSnO_3$ powder C3, and sample E8a prepared with a ink containing the $Fe^{3+}$ doped $BaSnO_3$ powder E8) in function of the $Fe^{3+}$ concentration in the $BaSnO_3$ samples.

FIG. 9 shows a comparison between the integrated photoluminescence intensity for the security features E1a-E8a and C3a upon excitation at 365 nm.

TABLE 5

Integrated NIR photoluminescence intensity upon excitation at $\lambda_{exc}$ = 365 nm

| Security feature no. | Integrated photoluminescence intensity |
|---|---|
| C3a | 100[a] |
| E1a | 152 |
| E2a | 154 |
| E3a | 155 |
| E4a | 180 |
| E5a | 153 |
| E6a | 155 |
| E7a | 138 |
| E8a | 90 |

[a] Integrated photoluminescence intensity of security feature C3a was set to 100% and the integrated photoluminescence intensities of the security features E1a-E8a were normalized accordingly.

The invention claimed is:

1. An iron-doped barium stannate material having a ferric cation concentration of 10 to 500 ppm by weight; wherein the material is a particulate material having a particle size distribution defined by d(0.9) from 3 to 15 μm as measured by light scattering.

2. The iron-doped barium stannate material according to claim 1, wherein the ferric cation concentration is of 10 to 300 ppm.

3. A process for manufacturing the iron-doped barium stannate material according to claim 1, comprising the steps:
   d) addition of $Fe^{3+}$ aqueous solution to a pre-stirred aqueous solution comprising $Ba^{2+}$ and $Sn^{4+}$ to obtain an aqueous solution;
   e) addition of the aqueous solution obtained at step d) to a NaOH aqueous solution to obtain a suspension containing an iron-doped $BaSn(OH)_6$ precipitate;
   f) adjusting a pH value of the suspension obtained at step e) to 11;
   g) separation of the iron-doped $BaSn(OH)_6$ precipitate; and
   h) calcination of the iron-doped $BaSn(OH)_6$ precipitate.

4. The process according to claim 3, wherein the pH value of the suspension is adjusted by addition of a NaOH or HCl aqueous solution.

5. The process according to claim 3, further comprising the step l) conducted after step h), respectively:
   l) sieving the calcinated precipitate obtained at step h).

6. A process for manufacturing the iron-doped barium stannate material according to claim 1, comprising the steps:
   i) addition of $Fe^{3+}$ solution to a mixture of $BaCO_3$ and $SnO_2$;
   j) grinding the mixture of step i); and
   k) calcination of the mixture obtained at step j).

7. The process according claim 6, further comprising the step l) conducted after step k), respectively:
   l) sieving the calcinated mixture obtained at step k).

8. The iron-doped barium stannate material according to claim 1 obtained by a process comprising the steps:
   d) addition of $Fe^{3+}$ aqueous solution to a pre-stirred aqueous solution comprising $Ba^{2+}$ and $Sn^{4+}$ to obtain an aqueous solution;
   e) addition of the aqueous solution obtained at step d) to a NaOH aqueous solution to obtain a suspension containing an iron-doped $BaSn(OH)_6$ precipitate;
   f) adjusting a pH value of the suspension of step e) to 11;
   g) separation of the iron-doped $BaSn(OH)_6$ precipitate; and
   h) calcination of the iron-doped $BaSn(OH)_6$ precipitate;
   or
   by a process comprising the steps:
   i) addition of $Fe^{3+}$ solution to a mixture of $BaCO_3$ and $SnO_2$;
   j) grinding the mixture of step i); and
   k) calcination of the mixture obtained at step j).

9. A photoluminescent security ink composition comprising the iron-doped barium stannate material according to claim 1.

10. The photoluminescent security ink composition according to claim 9, further comprising one or more coloring agents.

11. The photoluminescent security ink composition according to claim 9, further comprising one or more photoluminescent substances absorbing in ultraviolet spectrum range and emitting in visible spectrum range.

12. A security feature made with the photoluminescent security ink composition according to claim 9.

13. The security feature according to claim 12 obtained by applying on a substrate a photoluminescent security ink composition comprising an iron-doped barium stannate material having a ferric cation concentration of 10 to 500 ppm by weight, so as to form a photoluminescent security ink layer, and hardening the photoluminescent security ink layer.

14. The security feature according to claim 12, wherein the security feature is an indicium, an image, a pattern or a graphic element for authentication purposes.

15. A process for manufacturing the security feature according to claim 12 comprising the steps of applying on a substrate a photoluminescent security ink composition comprising an iron-doped barium stannate material having a ferric cation concentration of 10 to 500 ppm by weight, so as to form a photoluminescent security ink layer, and hardening the photoluminescent security ink layer.

16. A security document or article comprising one or more security features according to claim 12.

17. The security document according to claim 16, wherein the document is selected from the group comprising banknotes, deeds, tickets, checks, vouchers, fiscal stamps, tax labels, agreements, identity documents, access documents, packaging material for cosmetic articles, nutraceutical articles, pharmaceutical articles, alcohols, tobacco articles, beverages, foodstuffs, electrical/electronics articles, fabrics or jewelry.

18. A method for authenticating the security document or article according to claim 16 comprising the steps:
   a) illuminating the one or more security features on the security document or article with ultraviolet light;

b) measuring spectral parameters of a radiation emitted by the one or more security features in response to the illumination with ultraviolet light; and c) authenticating the security document or article.

19. The method according to claim 18, wherein measuring spectral parameters of a radiation emitted by the security feature comprises measuring an intensity of a radiation emitted by the security feature at one or more predefined near infrared wavelengths and/or an integrated intensity spectra of a radiation emitted by the security feature between two predefined near infrared wavelengths.

20. The method according to claim 18, wherein measuring spectral parameters of a radiation emitted by the security feature comprises measuring a decay property of an emitted radiation.

* * * * *